United States Patent [19]

Hareng et al.

[11] 4,150,396
[45] Apr. 17, 1979

[54] ERASABLE THERMO-OPTIC STORAGE DISPLAY OF A TRANSMITTED COLOR IMAGE

[75] Inventors: Michel Hareng; Serge Le Berre; Erich Spitz, all of Paris, France

[73] Assignee: Thomson-CSF, Paris, France

[*] Notice: The portion of the term of this patent subsequent to Aug. 2, 1994 has been disclaimed.

[21] Appl. No.: 774,044

[22] Filed: Mar. 3, 1977

Related U.S. Application Data

[63] Continuation-in-part of Ser. No. 585,715, Jun. 10, 1975, Pat. No. 4,040,047.

[30] Foreign Application Priority Data

Sep. 6, 1974 [FR] France .................. 74 30335

[51] Int. Cl.$^2$ .......................... H04N 9/31; G02F 1/13; H04N 5/74
[52] U.S. Cl. ........................................ 358/60; 358/63; 340/713; 340/795; 340/784; 350/351
[58] Field of Search .................... 358/60–62, 358/63, 230, 236; 350/160 LC, 331, 351; 340/173 LT, 324 R; 365/108, 218

[56] References Cited

U.S. PATENT DOCUMENTS

| | | | |
|---|---|---|---|
| 2,337,980 | 12/1943 | Du Mont et al. | 358/60 |
| 2,594,715 | 4/1952 | Angel | 358/6 |
| 2,601,328 | 6/1952 | Rosenthal | 358/60 |
| 3,569,988 | 3/1971 | Schmidt et al. | 358/60 |
| 3,624,278 | 11/1971 | Heckscher | 358/54 |
| 3,723,651 | 3/1973 | Gorog | 358/236 |
| 3,761,172 | 9/1973 | Letzer | 350/160 LC |
| 3,796,999 | 3/1974 | Kahn | 350/160 LC |
| 3,836,243 | 9/1974 | Melchior | 350/160 LC |
| 4,040,047 | 8/1977 | Hareng et al. | 358/236 |

*Primary Examiner*—John C. Martin
*Attorney, Agent, or Firm*—Cushman, Darby & Cushman

[57] ABSTRACT

The invention provides an optical display device, utilizing a thermo-optical effect to inscribe a transmitted image in a layer of a material exhibiting a smectic state. Recording of the image with a full range of half tones without modulation of the recording beam and quick erasure of the recorded image without reheating of the film can be obtained by directly applying, simultaneously to the whole of the film either the video signal or an erasure voltage of suitable values. By associating this display device to a projection device utilizing a very bright source, the image thus recorded can be projected onto a large screen or a photosensitive substrate. The invention also describes a color images teleprojection and telereproduction device, in which three distinct chrominance images are recorded in a smectic layer as above described and simultaneously illuminated with white light; the three beams thus obtained are filtered for respectively selecting in each of them the spectral band corresponding to the chrominance of the image and superimposed in a single beam by a reflecting system. An objective lens supplied with a diaphragm in its image focal plane receives this single beam and projects the reconstituted colour image onto a screen or a photo-sensitive layer.

12 Claims, 7 Drawing Figures

ERASABLE THERMO-OPTIC STORAGE DISPLAY OF A TRANSMITTED COLOR IMAGE

This is a continuation-in-part of the co-pending application, Ser. No. 585,715, filed on June 10, 1975, now U.S. Pat. No. 4,040,047.

FIELD OF THE INVENTION

This invention relates to optical storage and display devices and more particularly to electro-thermo optical liquid crystal devices for storage, display and projection of black and white or color transmitted images.

BACKGROUND OF THE INVENTION

In prior art, it is known that, when a thin film of a material exhibiting a smectic phase is cooled from the liquid phase, the optical appearance of the thin film closely depends upon the rate of cooling; if cooling is slow, the material will orientate itself uniformly and the film will appear perfectly transparent; if, however, the transition from the liquid phase to the smectic phase takes place very rapidly, then in the film domains occur which have different orientation in relation to one another and give rise to strong scattering of the transmitted or reflected light. It is well-known to utilize this effect in order to temporarily record an image on a liquid crystal film presenting a smectic phase. The material, arranged between two glass plates, is maintained at a temperature such that it is in its smectic phase but as close as possible to the transition temperature to the nematic phase; the molecules are uniformly orientated and the film is transparent. A light beam (the terms "light" and "luminous", here, as in the remainder of the text, are used in the broadest possible sense to designate electromagnetic radiations in the ultra violet, visible and infra-red parts of the spectrum), generally chosen within the near-infra-red part of the spectrum and intensity modulated, scans the surface of the film. When the energy locally introduced by the beam has been sufficient to produce melting at a point in the film, then, on the occasion of the rapid cooling which follows, a texture forms which diffuses the light, whilst the unmelted points remain transparent. The image thus obtained can be lighted by a very bright luminous source and projected onto a large screen or a photosensitive substrate.

The two problems posed by this method are those of erasing and the production of half-tones.

Erasing can be effected in two ways. The first is to heat the whole film until the liquid phase appears and then to cool it in a controlled manner in order to bring about the formation of an ordered, transparent structure. A second, which enables selective erasing to be carried out, consists in subjecting the film to an alternating transverse electrid field having a frequency of the order of one kHz, whilst carrying out scanning with the modulated light beam as at the time of recording. The points raised to the melting temperature by the beam, under the orientating influence of the field, return to an ordered smectic phase and therefore become transparent. These two methods of erasing have the drawback that they are slow.

In order to obtain half-tones, it has been suggested to utilize as a thin film, a mixture of two constituents. Then, the fusion of the film does not occur at a well defined temperature, but ranges along a certain temperature gap, for which the material is pasty. The higher is the intensity of the recording beam and consequently the closer the material approaches the highest temperature of this gap, the more pronounced the disorder in the texture obtained after cooling and the correspondent light scattering. Unfortunately, it is difficult in this way to obtain a satisfactory range of half-tones. Moreover, the modulator is an expensive element and its inclusion results in a loss in the power available for recording and therefore in a reduction in the image recording rate.

SUMMARY OF THE INVENTION

It is an object of the invention to provide a black and white images display device with half-tones in which these various drawbacks of the prior art are overcome by subjecting a thin film both at the time of recording and at the time of erasing, to the effect of electric fields of appropriate strengths; overall erasing of the cell can thus be achieved in a very short time and independently of any scanning beam; in addition, recording, both of black and white and of the half-tones, can be carried out by scanning the film with a beam of constant intensity; the beam modulator is discarded and the video signal is applied directly between two electrodes between which the film is located.

It is another object of the invention to provide a black and white image teleprojection and telereproduction device by associating a display device as above with an optical projecting system and a screen or a photosensitive substrate.

It is a further object of the invention to provide a color image teleprojection and telereproduction device by inscribing in a display device as above, made of a single or three independent cells, three black and white chrominance images corresponding to the three chromatic components of a transmitted color image, illuminating these images with white parallel light, filtering and superimposing the beams thus obtained and concentrating them onto a screen or a photosensitive substrate.

BRIEF DESCRIPTION OF THE DRAWING

The invention together with its features, advantages and objects, can be better understood from the following detailed description, when read in conjunction of the drawing in which.

DETAILED DESCRIPTION OF THE INVENTION

Figure 1:
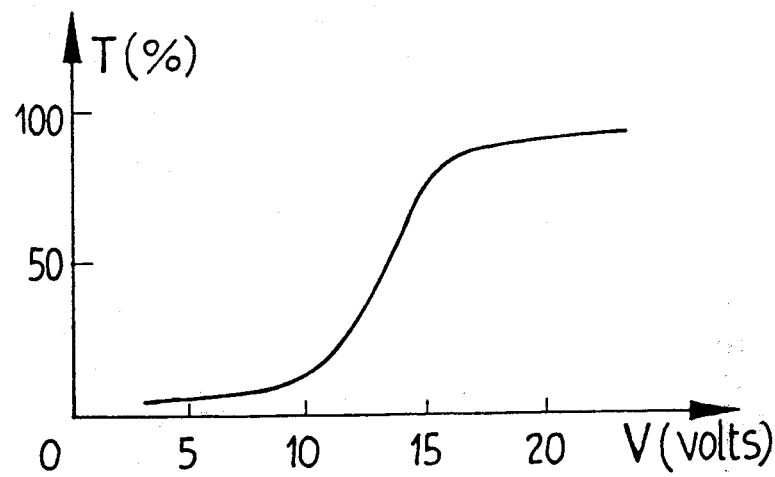
FIG. 1 is a graph illustrating the operation of the device in accordance with the invention.

Studies have been carried out in the laboratories of the applicant, on various classes of liquid crystals exhibiting a smectic phase, and in particular on substances in the diphenyl-nitrile family. Compounds belonging to this family, for example octyl-nitrile-4-4'-diphenyl, of the formula:

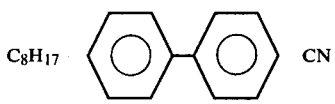

or octyl-oxy-nitrile-4-4'-diphenyl, of the formula:

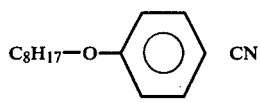

or mixtures of these substances, exhibit a smectic phase A at ambient temperature, in which the long molecules constituting these compounds tend to organise themselves into a homeotropic structure (the long molecules arrange themselves in a uniform orientation perpendicularly to the supporting plates). This homeotropic orientation in which the thin film is perfectly transparent, is facilitated if the supporting plates are coated with certain materials, for example silane.

In these compounds, the following transitions are observed:

at $T_1$: a transition from the solid crystalline phase to the smectic phase A;

at $T_2$: a transition from the smectic phase A to the nematic phase;

at $T_3$: a transition from the nematic phase to the isotropic liquid phase.

By way of example, the transition temperatures for octyl-nitrile-4-4'-diphenyl are as follows:
$T_1 = 20°$ C.; $T_2 = 32°$ C; $T_3 = 39.5°$ C.

The studies carried out have pointed up two important results.

The first of these results is concerned with the restructuring of the material in the smectic phase, from the disordered, light scattering structure, also known as the "focal conic structure", to the homeotropic structure which is an ordered and transparent one. It has been observed that by subjecting the thin film to the effect of a direct or alternating electric field (in the latter case at a frequency which may reach up to 50 Kc/s), perpendicular to the plane of the film, a very rapid transition from the focal conic structure to the homeotropic structure can be obtained without any need to go through the liquid phase. Taking films 8 microns in thickness, conversion from the scattering state to the transparent state can be achieved in 100 milliseconds by applying across the film a 50 volt voltage. This provides an extremely simple tool to use in order to effect erasing of images recorded by thermooptical effect.

The second of these results is concerned with the effect due to the application of an electric field at the time of transition from the liquid phase to the nematic phase. It has been discovered that during fast cooling of the material in the liquid phase, the application of a direct or alternating electric field (in the latter case at a frequency ranging between 0 and 50 Kc/s) perpendicular to the plane of the thin film, contributed to the homeotropic orientation of the material, and thus provided means for controlling the state of disorder of the focal conis structure; it is thus possible, depending upon the strength of the applied field, to achieve a continuous transition between the fully scattering state (corresponding to the state of maximum disorder) which occurs at zero field, and the fully transparent state (corresponding to the fully homeotropic structure) which occurs at maximum field.

The graph of FIG. 1 which relates to an 8 micron thick film of octyl-nitrile-4-4'-diphenyl, summarises these observed phenomena; as a function of the voltage V (in volts) applied to the film and plotted on the abscissae, this graph shows the true transmission factor T (the percentage, in relation to the incident light, of the light directly transmitted, excluding scattered light) of a point in the material after transition to the liquid phase under the action of the light beam scanning the film, and return to the smectic phase. For voltages of less than 10 volts, the material produces major scatter and the point appears black by transmission (transmission factor of less than 10%). Between 10 and 15 volts, the homeotropic structure becomes more and more pronounced and the material scatters less and less, the transmission factor then varying from 10 to 90%; this is the half-tone region in which the point appears progressively brighter and brighter; finally, at 20 volts, the full homeotropic structure is gained and the point exhibits a transparency of 100%. It has also been observed that the voltage applied is only operative during the very brief time of cooling and therefore does not modify the more or less scattering condition of neighbouring points.

The observation summarized in the graph of FIG. 1, show that recording of an image with half-tones can be achieved by thermo-optical effect, without any modulation of the light beam scanning the cell by the video signal, by simply using this video-signal to modulate a voltage applied to the cell.

Figure 2:
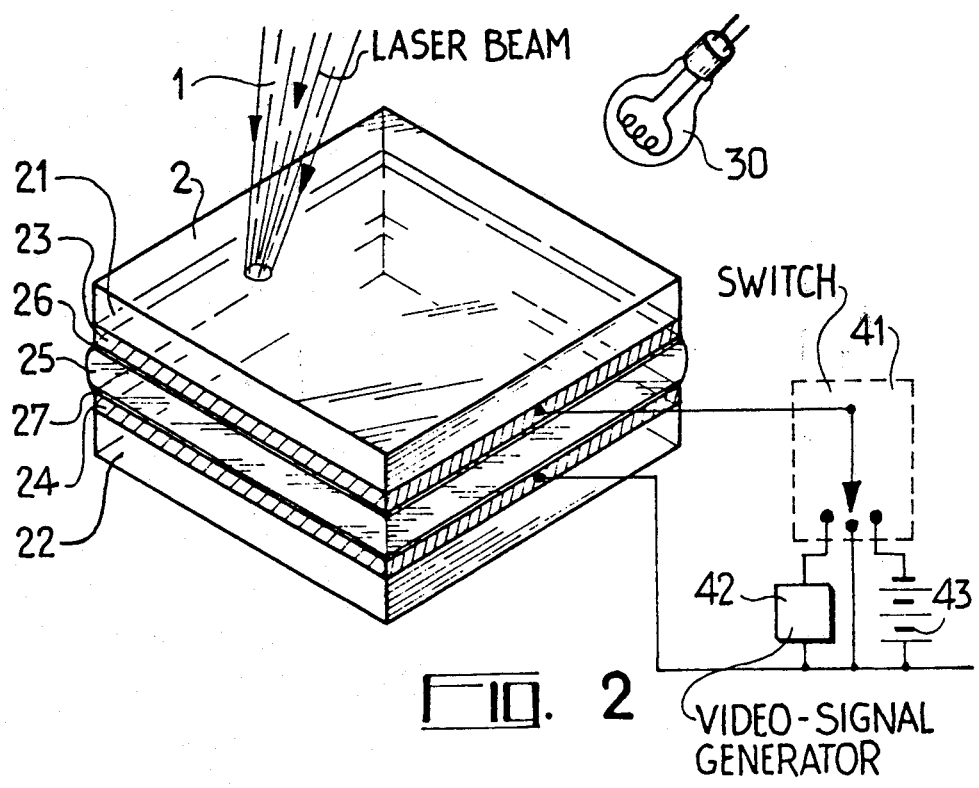
FIG. 2 illustrates a black and white image display device in accordance with the invention.

FIG. 2 illustrates a display device for reproducing black and white images, which utilizes the experimental result set out hereinbefore. A convergent recording beam 1 having a wavelength of 1.06 microns and coming from a YAG laser source not shown in the figure, scans the cell 2. The latter is constituted by a thin film 25 of octyl-nitrile-4-4'-diphenyl arranged between two parallel glass plates 21 and 22; on these two plates, two transparent electrodes 23 and 24 are arranged, these being constituted for example by a deposit of mixed indium and tin oxide; these electrodes are preferably coated, although this is not absolutely essential, on those of their faces in contact with the thin film 21, with a fine film of silane, respectively 26 and 27. A three-way switch 41 applied between the two electrodes 23 and 24 either the video signal corresponding to a direct or alternating voltage varying between 0 and 20 volts and coming from the video signal generator 42, or the constant direct or alternating voltage having a peak value of only 50 volts, coming from the voltage generator 43, or short-circuits the two electrodes. A light source 30 enables the cell 2 to be illuminated. This source may simply be constituted by the ambient light.

The cell 2 is thermostatically controlled by means which have not been shown in the figure, to a temperature T ranging between $T_1 = 20°$ C. and $T_2 = 32°$ C., so that the material of which the film 25 is made is in the smectic phase when not subjected to the action of the beam 1; the temperature T is chosen to be as close to $T_2$, the temperature of the smectic-nematic transition, as the accuracy of the thermostat will permit. It is also possible to employ the two electrodes as heating resistors in order to maintain the film 25 at a required temperature.

To record the image, the beam 1 scans at uniform rate the cell 2, being focussed on the film 25 which is assumed initially to be in a condition of uniform homeotropic orientation. Throughout the time of scanning, the switch 41 connects the electrodes 23 and 24 to the video signal generator 42; the whole of the thin film 25 is then subjected to the variable voltage representing the video signal. The energy transmitted by the beam is absorbed in the two films 23 and 24 constituting the electrodes and transmitted to the film 25. The beam intensity is constant; it is designed, as a function of the dimension of the focal spot and of the scanning speed, to ensure that the energy locally introduced by the beam is sufficient to raise a point on the material of which the the film 25 is made, to a temperature T slightly higher than $T_3$, thus producing melting of the point in the material.

As soon as the beam has moved on, the point which has melted tends to revert instantaneously to the temperature T determined by the thermostat and thus to convert from the liquid phase to the smectic phase, passing through the intermediate nematic phase. This double transition takes place at a field strength determined by the value of the voltage corresponding to the video signal applied to the overall film at this precise instant; the instantaneous value of this field strength fixes the degree of order of the smectic structure and therefore the maximum or minimum degree of scattering on the point in question. Thus, if the cell 2, illuminated by the source 30, is observed by transmission, then the points recorded at low field strength and therefore exhibiting maximum scatter, will appear black whilst those recorded at maximum field strength, thus perfectly ordered and transparent, will appear white. If observed by reflection, then the cell 2 will produce a reverse image: black and white points will correspond respectively to maxima and minima in the video signal. Depending upon the situation, the video signal may be constituted by a voltage of constant sign, continuously variable between 0 and 20 volts, or by an alternating carrier voltage amplitude-modulated by the video signal.

When the scanning of the cell has been completed and the whole image recorded, the recording beam 1 is cut off and the electrodes 23 and 24 are short-circuited by the switch 41. The recorded image can be stored for several hours. To erase the image, the beam 1 remains cut off and the switch 41 connects the electrodes 23 and 24 to the constant voltage of around 50 volts. Under the influence of the latter, the film 25 becomes uniformly orientated with a homeotropic structure, this orientation being promoted by the silane coatings 26 and 27; the cell becomes transparent over its whole area and is then ready for a fresh recording. In this way, the erasing of the image can be achieved in around 100 microseconds. Although, earlier on, compounds (octyl-nitrile-diphenyl, octyl-oxy-nitrile-diphenyl and mixtures thereof) have been described which are well suited to the production of the thin film 25, there is no doubt that other compounds and mixtures could be found, in particular within the diphenyl-nitrile family, which would exhibit a smectic phase and would be suitable for the same kind of application; it is within the spirit and scope of the invention to utilise these substances in the manner hereinbefore described.

In FIG. 2, for reasons of simplicity, the switch 41 has been illustrated as manually operated. However, it could better be replaced by an electronic switching arrangement if the phases of recording and erasing are to succeed one another at high rate.

The wavelength of the recording light beam described in the above example as being located in the near-infra-red, may in fact be chosen to fall within any part of the range extending from the ultra-violet to the infra-red; the primary criteria governing this choice are the available power of the source and the cell absorption; in this latter context, the radiation should be chosen in such a fashion that it is absorbed either by the material of which the film 25 is made or by one or two supplementary films in contact with the film 25. In view of the fact that around 1 nanojoule per cubic micron of material is required in order to bring about the smectic-liquid transformation, a beam having a power of 1 watt and furnishing a focal spot in the order of 50 microns in diameter, makes it possible to record an image of $200 \times 200$ points in 1 second.

Figure 3:
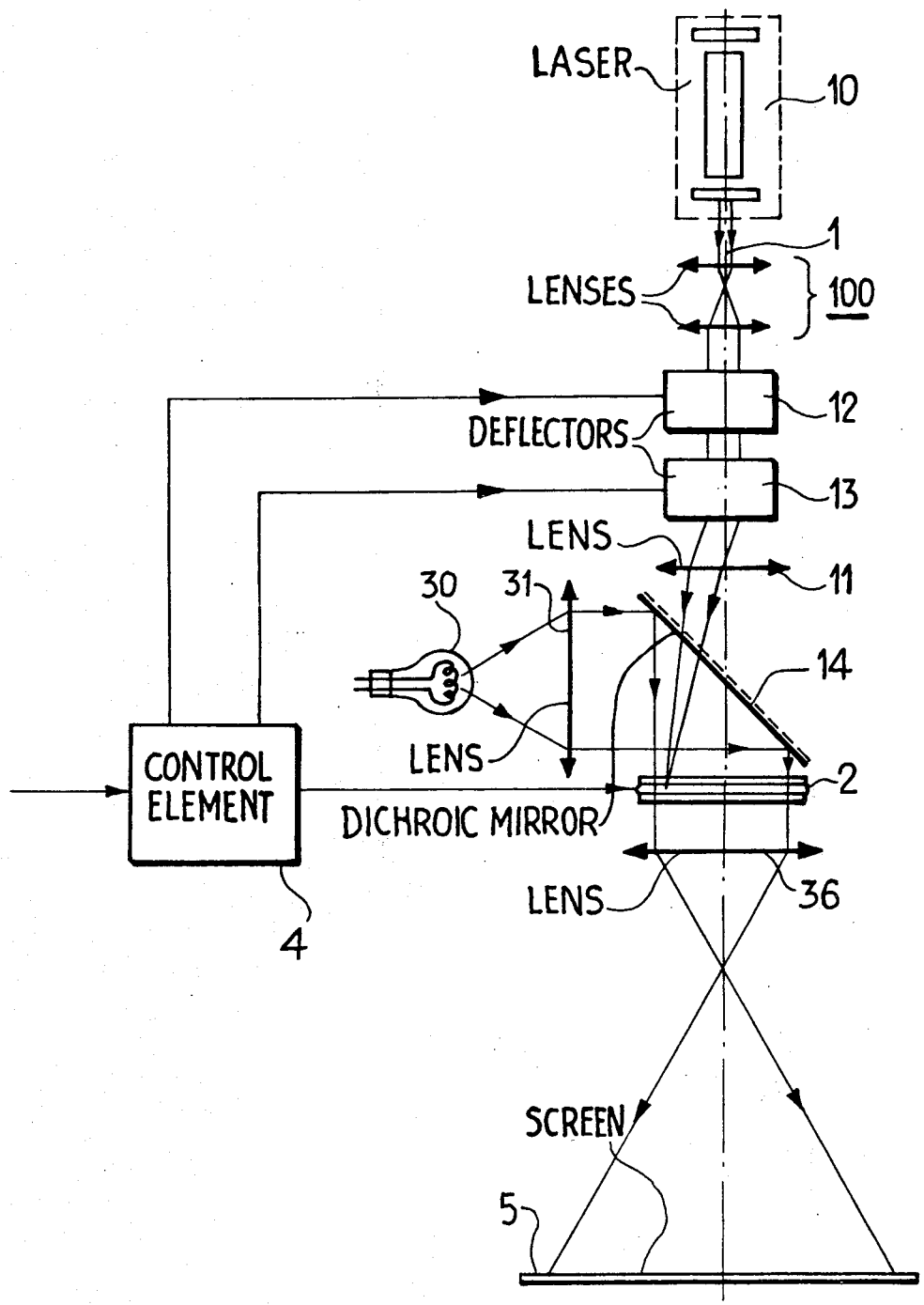
FIG. 3 illustrates a teleprojection and a telereproduction device utilizing the device in accordance with the invention for the projection and reproduction of black and white images.

By way of an example, FIG. 3 describes a teletransmission and telereproduction system for black and white images, which utilizes the image display device described hereinbefore. A YAG laser source 10 emits the recording beam in the form of a parallel light beam 1 which passes through an optical system 100 designed to increase its diameter, and then through the two electro-optical or electro-acousto-optical deflectors 12 and 13, which enable the beam direction to be varied in a plane which is that of the figure and in a plane at right angles thereto; it is then focussed by the objective lens 11, through the dichroic mirror 14, in the plane of a cell 2 identical to that described in FIG. 2, and more precisely in the central plane of the material constituting the film 25 of FIG. 2.

A light source 30, at the focus of a collimating lens 31, emits a parallel illuminating beam which, reflected by the dichroic mirror 14, uniformly illuminates the entire surface of the cell 2; the cell 2 thus illuminated by transmission, modulates said parallel beam as a function of the varying states of scattering which its different points produce; the objective lens 36 projects upon the plane 5 the image recorded upon the film marked 25 in FIG. 2 and forming part of the cell 2.

The control element 4 receives the video signal and its synchro pulses. On the one hand, it distributes the synchro pulses between the respective inputs of the deflectors 12 and 13, and on the other replaces the manual switch 41 of FIG. 2; on receiving the synchro pulse which triggers the scanning of the image, it applies the video signal between the electrodes and short-circuits these latter on occurrence of the synchro pulse corresponding to the end of the image; a special synchro pulse triggers the erase voltage which is also supplied by the control element 4.

If the illuminating light is chosen within a wavelength range such that it is not absorbed by the cell 2, it is possible to utilize a very powerful light source 30 without disturbing the operation of the cell 2 by heating, and thus to project the image reproduced by the cell onto a large-sized screen arranged in the plane 5.

In this fashion, a large-screen teletransmission system for black and white images can be provided.

By arranging a photosensitive material in the plane 5, instead of a screen, the system described can be utilized for black and white facsimile transmission (telereproduction system).

Figure 4:
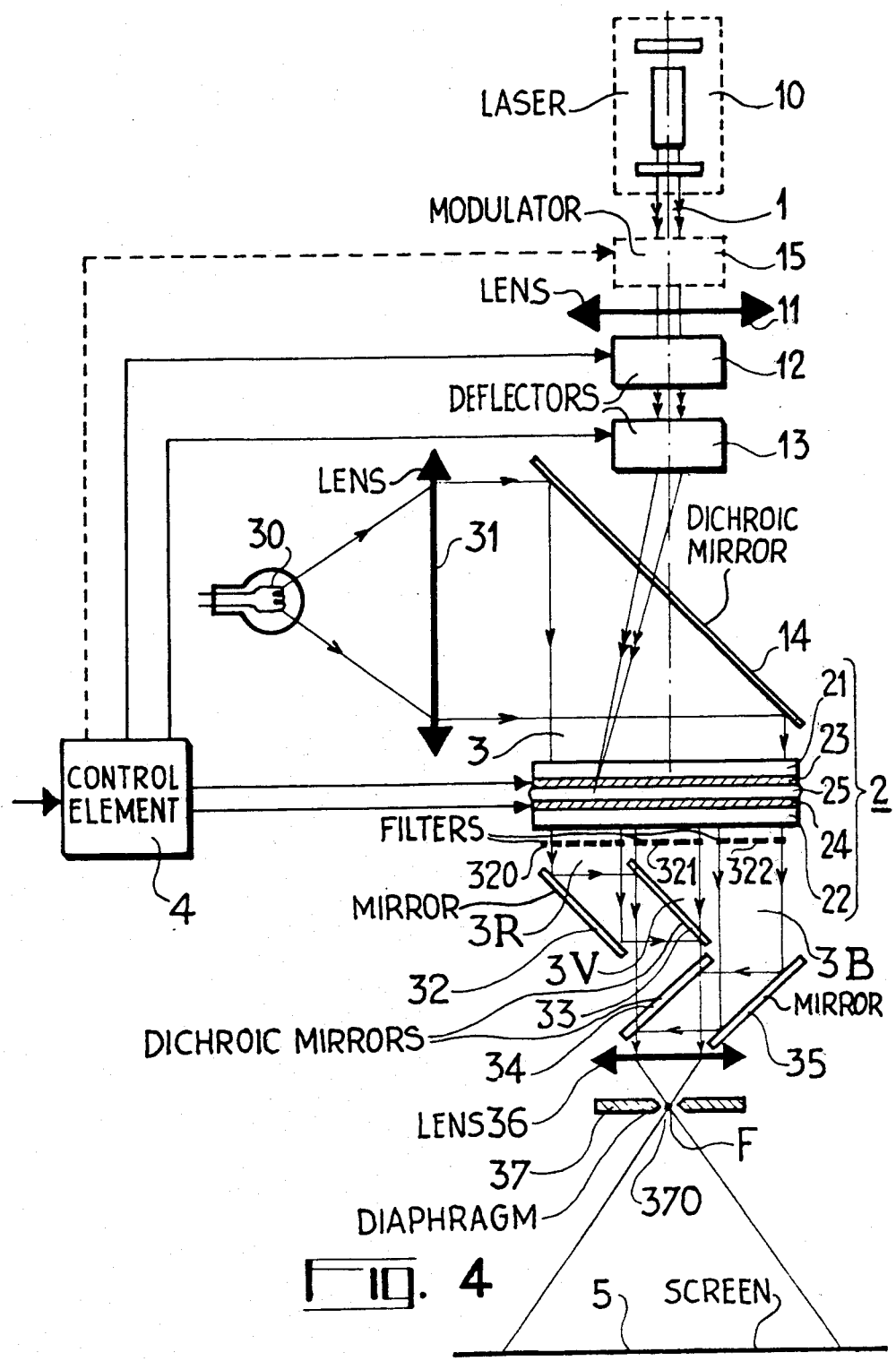
FIG. 4 illustrates a first embodiment of the invention for the teleprojection of a color image.

There is shown in FIG. 4 a first embodiment of a color image teleprojection and telereproduction device embodiment in which a single smectic liquid crystal cell as shown in FIG. 2 is used to provide three juxtaposed black and white chrominance images corresponding to three components of the transmitted color image.

A parallel light beam 1, referred to as the recording beam and produced by a laser source 10 (a YAG laser for example emitting at 1.06 microns), successively encounters a focussing objective lens 11, two electro-optical deflectors 12 and 13, a dichroic mirror 14 which is transparent vis-a-vis the radiation emitted by the source 10 and, finally, the liquid crystal cell 2. The cell is constituted by two glass plates 21 and 22 coated on their internal faces with two transparent electrodes 23 and 24 and enclosing a liquid crystal layer 25 approximately 8 microns in thickness. A thermostat which has not been known in the figure, maintains the cell at a constant temperature so selected that the material of which the liquid crystal film is made (octyl-nitrile-4-4'-diphenyl for example) is in its smectic phase. The objective lens 11 focuses the beam 1 in the plane of the film 25.

In addition, the cell 2 is uniformly illuminated by a parallel beam 3 of white light known as the illuminating beam and coming from a source 30, this beam being collimated by the objective lens 31 and reflected by the dichroic mirror 14 which is reflective in the visible range of the spectrum.

The control element 4 receives the video signal transcribing the image which is to be displayed, accompanied by the synchronization pulses. It distributes these pulses between the inputs of the deflectors 12 and 13 and applies the video signal in the form of an amplitude-modulated direct or alternating voltage of appropriate value, between the electrodes 23 and 24.

The operation of this part of the device is as follows: the recording beam 1, deflected in two mutually perpendicular directions, one in the plane of the figure and the other in a plane perpendicular thereto, scans the film 25 line by line; the beam power is regulated, as a function of the scanning speed and the dimension of the focal spot, so that material of which the layer 25 is made is raised, at the point of impact, to a temperature slightly higher than the temperature at which it converts to the liquid phase. This scanning is synchronised by the synchronization pulses emitted by the control element 4. The variable voltage corresponding to the video signal and emitted by the same element 4, makes it possible to achieve more or less uniform orientation of the material at the time of restoration to the smectic phase; the initially transparent layer 25 thus, after scanning by the recording beam, has a scattering coefficient variable from one point to another, as a function of the video signal applied at the instant of cooling. Examined by transmission, the various points in the layer will therefore have a darker appearance the more pronounced their scattering.

Figure 5:
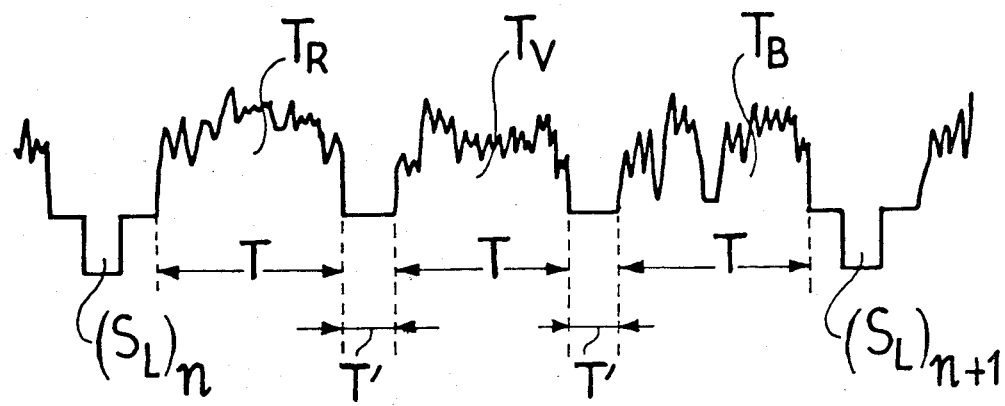
FIG. 5 illustrates the video signal applied to the device of FIG. 4.
Figure 6:
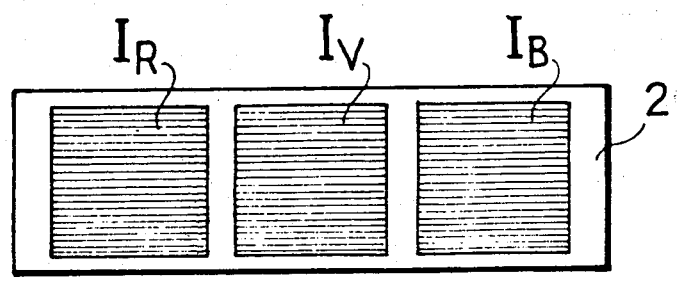
FIG. 6 illustrates the arrangement of the three chrominance images recorded upon the cell which forms part of the first embodiment shown in FIG. 4.

FIG. 5 illustrates the video signal received by the control element 4 between two successive line synchronization pulses $S_L$. It will be seen that a line comprises three periods of equal duration T; during the first period $T_R$, the video signal transmits the red chrominance component, during the second $T_V$, the green chrominance component, and during the third $T_B$, the blue chrominance component; these three periods are separated by blanking steps of duration T' during which no voltage is applied to the electrodes. The same succession of red, green and blue chrominance components occurs with each line. The cell accordingly, as FIG. 6 shows, records three juxtaposed images $I_R$, $I_V$, $I_B$, separated by intervals in which the layer exhibits maximum scattering; each image, in the form of variations in the scattering coefficient, translates the variation in intensity of one of the images, red, green, and blue, resulting from the trichromatic scanning of the colour images which is to be reproduced, $I_R$, $I_V$ and $I_B$ corresponding respectively to the red, green and blue images.

In view of the fact that the cell 2 constitutes a storage system capable of storing the recorded images, it is also possible, in accordance with a variant embodiment of the invention, to first of all record the complete image $I_R$, then the image $I_V$ and then the image $I_B$. The video signal received by the control element 4 then, between two image synchronization pulses, contains all the information relating to one of the images $I_R$, $I_V$ and $I_B$, the deflectors 12 and 13 then being programmed to effect corresponding scanning of the cell. In either case, the device utilises the same bandwidth as for the transmission of a black and white image but the transmission of a colour image three times the time needed for a black and white image.

In the device described above, the video signal coming from the control device 4, is applied to the two electrodes 23 and 24 enclosing the film 25. It is also possible to discard these two electrodes and to apply said same video signal to a modulator 15 arranged between the source 1 and the objective lens 11, this modulator modulating the intensity of the recording beam.

Referring again to FIG. 4, it will be seen, from inspection of the bottom part thereof, that there is an assembly of optical elements located beneath the cell 2 and designed to project a single colour image obtained from the three images $I_R$, $I_V$ and $I_B$ recorded in the cell 2 and illuminated with white light by the beam 3.

The three images $I_R$, $I_V$ and $I_B$ delimit, within the light beam 3 and after transit of the cell 2, three light beams, respectively 3R, 3V and 3B. In the paths of these beams, four dichroic mirrors 32, 33, 34 and 35 all inclined at 45°, are arranged. The mirrors 32 and 33 are reflective in the red, transparent in the blue and the green parts of the spectrum; the mirrors 34 and 35 are reflective in the blue, transparent in the red and the green. As FIG. 4 shows, their design is such that the three beams are superimposed to form a single beam, coaxial with that 3V, in the path of which an objective lens 36 is arranged. A diaphragm 37 is arranged in the image focal plane of the objective lens 36; it contains a small opening 370 at its centre, coinciding with the focus F of the objective lens. A colour image, resulting from the superimposition of the three images $I_R$, $I_V$ and $I_B$ formed on the cell 2 and viewed through the dichroic mirrors, is thus obtained on a screen 5 arranged at an arbitrary distance from the objective lens.

By the addition of the diaphragm 37, it is contrived that only those rays emerging from the cell 2 at normal incidence, are involved in the formation of the image projected on to the screen; under these circumstances, as indicated earlier, the greater the scattering exhibited by a point in the cell, the less bright its appearance in the image; this device also makes it possible to produce a sharp image whatever the position of the screen 5.

The beams 3R, 3V and 3B resulting from the white light illumination of the three images $I_R$, $I_V$ and $I_B$, contain all the wavelengths of the visible spectrum, intensity modulated. Double reflection at the dichroic mirrors 32 and 33 means that the beam is left simply with the red component. Similarly, the double reflection at the mirrors 34 and 35 leaves only the blue component in the beam 3B. As far as the beam 3V is concerned, it loses its red component on passing the mirror 33, its blue component on passing the mirror 34 and accordingly, only retains its green component when it encounters the objective lens 36. The beam which enters the objective lens 36 therefore comprises the three components, red, green and blue, respectively intensity modulated by the images $I_R$, $I_V$ and $I_B$, and thus makes it possible by additive trichromatic synthesis to reconstitute a colour image.

It is important to point out that in the device shown by FIG. 4, the power of the source 30 producing the white light and emitting the illuminating beam 3, can be made very high without in so doing disturbing the layer 25 which does not absorbs, but only scatters, the illuminating beam, and this makes it possible to effect large-screen projection of colour images.

The device which forms the object of the present invention can readily be converted to a device for the telereproduction of colour images. To do this, it is merely necessary to replace the screen 5 by a trichromatic photosensitive emulsion.

Figure 7:
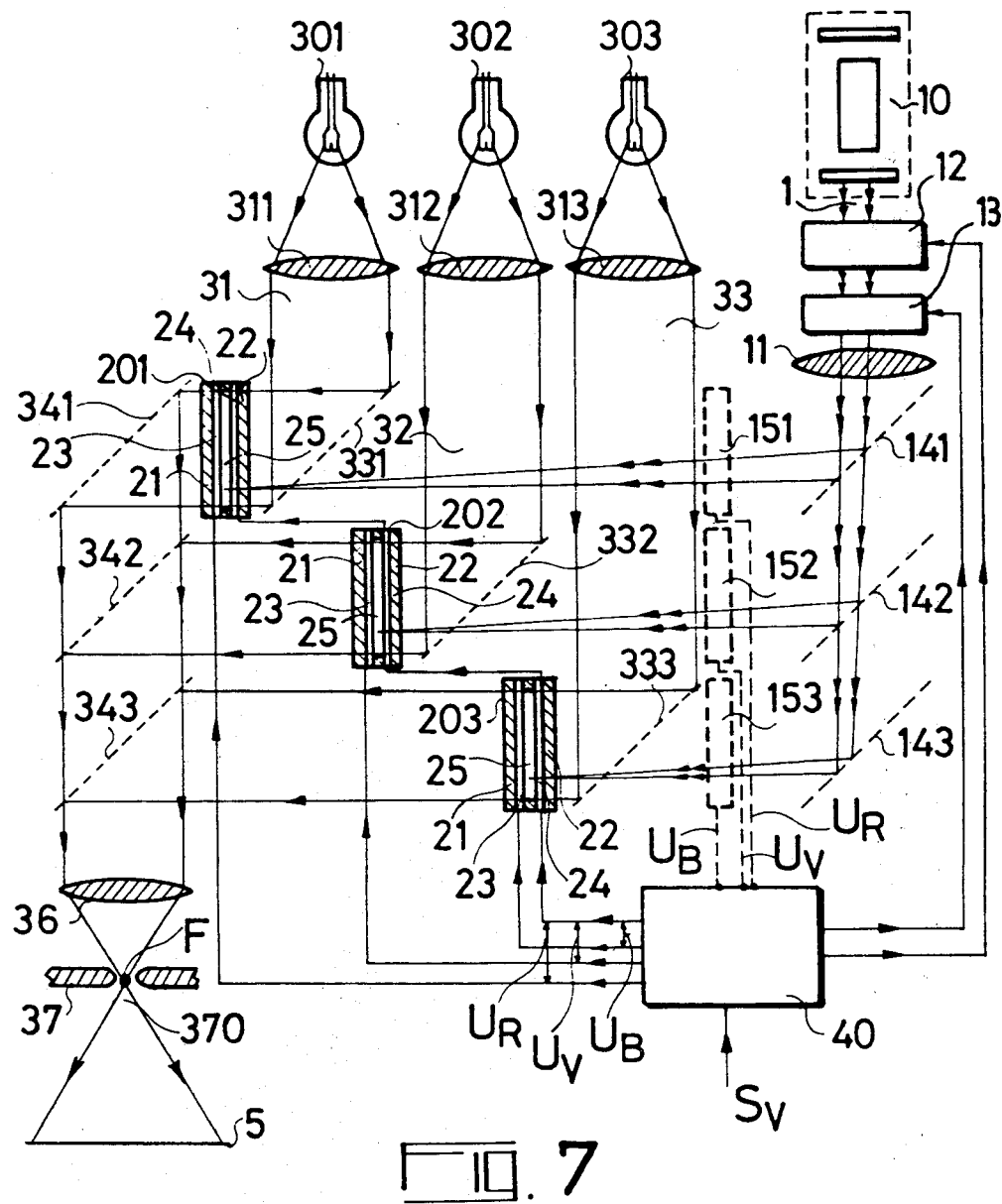
FIG. 7 illustrates a second embodiment of the invention for the teleprojection of a color image.

FIG. 7 shows a modification of the device shown in FIG. 4. In this modification, the three images $I_R$, $I_V$ and $I_B$, transcribing in the form of variations in the coefficient of scattering of a thin layer, the variations of intensity of the three chrominances of the image or picture to be reproduced are written simultaneously on three distinct cells; the three cells can then be disposed in three different planes located at the same distance from the porjection objective, which facilitates the projection of the trichromic images reconstituted on the screen.

There are shown in FIG. 7 a numbers of elements shown with the same reference characters in FIG. 4 and having the same functions: the laser source 10 emitting the writing beam 1, deflected by the two deflections 12 and 13 and focussed by the focusing objective 11, the projection objective 36 provided in its image focal plane with the diaphragm 37 provided with the orifice 370 and projection screen 5.

On the other hand, the device has three distinct cells 201, 202 and 203 which are identical with each other and constituted as the cell 2 shown in FIG. 2, by two glass plates 21 and 22, two transparent electrodes 23 and 24 and a film 25 of a liquid crystal material in smectic phase.

The recording beam 1 is reflected on the three cells 201, 202 and 203 by the three mirrors 141, 142 and 143 in the form of three beams of equal intensity; for this purpose, the two mirrors 141 and 142 are semi-transparent with respect to the radiation emitted by the source 10, the first having a coefficient of reflection of 0.33 and the second 0.50 with respect to this radiation. The distance between the three cells and the principal image plane of the objective 11 is identical and equal to the focal length of this objective; the three beams are thus focussed within the thin layer 25 of each cell which they scan in a identical manner.

The three cells 201, 202 and 203 are moreover uniformly illuminated by three parallel illuminating beams 31, 32 and 33 obtained from the sources of white light 301, 302, 303 disposed at the focus of the collimators 311, 312 and 313; the white light which issues from the three cells is received by the three dichroic mirrors 341, 342 and 343 are projected in the form of a single beam on the objective 36; the mirror 341 reflects solely the red, the mirror 342 reflects the green and transmits the red; the mirror 343 reflects the blue and transmits the green and the red. The screen 5 is disposed in the principal object plane associated with the three cells.

A control means 40 receives a video signal $S_V$ resulting from the trichromic analysis of the image to be reproduced. This signal $S_V$ may be similar in its form to the conventional video signals employed for the broadcasting of televised images.

The generator 40 extracts the line and picture synchronization pulses which it sends respectively to the deflectors 12 and 13, and the three chrominance signals which it directs, in the form of three amplitude modulated voltages $U_R$, $U_V$ and $U_B$ corresponding to the chrominances red, green and blue respectively, to the three cells 201, 202 and 203. The control means 40 also furnishes the erasing pulse $U_E$ which is sent to the three cells simultaneously.

This device operates in a manner very similar to that of the device shown in FIG. 4. Each cell records, in the form of variations of the scattering coefficient, an image which translates the variations of intensity of one of the three trichromic components of the image to be reproduced, respectively red, green and blue, for the cells 201, 202 and 203, the three images being in contradistinction to the device shown in FIG. 4, recorded simultaneously. The association of the objective 36 and the diaphragm 37 permits translating into variation of light intensity of the screen 5 the variations of scattering coefficient obtained on the cells and the dichroic mirror associated with each cell permits the projection of the image written on the latter in the corresponding colour. As the assembly of the three images 341, 342 and 343 permits superposing the three images on the screen 5, the coloured image is thus reconstituted.

The images written in the three cells are recorded in a durable manner. The erasing pulse $U_E$ furnished by the control means 40 enables these three images to be erased simultaneously for the projection of a new transmitted image. If the successive images are transmitted one after the other, it is possible to control this erasing signal by the image synchronizing pulse. It is also possible to employ for the three sources 301, 302 and 303 flash lights which are turned on simultaneously also by the image synchronization pulses so as to obtain the following sequence: writing of the image, projection on the screen 5, erasing the projection and erasing phases occuring in the case of the conventional video signal during the period corresponding to the return of the image scanning spot.

FIG. 7 also shows that it is possible to obtain the writing of the chrominance images in the three cells 201, 202 and 203 by modulating the intensity of the three writing beams by three modulators, for example electro-optical modulators 151, 152 and 153 controlled by the voltages $U_B$, $U_R$ and $U_V$. The electrodes 24 and 25, and their connections with the control means 40, which no longer serve any purpose, may then be dispensed with in the three cells.

What we claim is:

1. A device for the projection of color images transmitted under the form of a video-signal, comprising:
   control means for receiving said video signal and supplying three chrominance signals, synchro pulses and erasing pulses;
   intermediary display means for inscribing, storing and erasing three chrominance images under the control of said control means and including:
   at least one display cell; said display cell comprising one layer of a material having a smectic phase; said layer being maintained at a first constant temperature to be in said smectic state; and one pair of transparent electrodes; said electrodes enclosing said layer for receiving at least one of said three chrominance signals and said erasing pulses; and optical recording means controlled by said synchro-pulses for providing at least one luminous spot of substantially constant intensity; said luminous spot scanning said layer with substantially uniform scanning rate for temporarily heating successively each point thereof from said first constant temperature to a second constant temperature at which said layer is an isotropic liquid state;

said three chrominance images consisting in local variations in the scattering effect of said layer;

illumination means for illuminating said three chrominance images with white light and thus generating three chrominance beams;

optical filtering means for selecting in each said chrominance beam the spectral band associated to said chrominance image;

reflective means for combining said three chrominance beams into a single combined beam; and projection means for receiving said single combined beam and illuminating a receiving surface with said color images.

2. A device as claimed in claim 1, wherein said projection means include an objective lens and a diaphragm, the aperture of said diaphragm coinciding with the image focus of said objective lens.

3. A device as claimed in claim 1, wherein said display cell being a single display cell, said three chrominance images are recorded side by side in said single display cell.

4. A device as claimed in claim 3, wherein said optical recording means provide a single recording luminous spot: said recording spot scanning said layer line after line for simultaneously recording said three chrominance images.

5. A device as claimed in claim 3, wherein said optical recording means provide a single recording luminous spot; said recording spot scanning said layer for successively recording said three chrominance images.

6. A device as claimed in claim 3, wherein said reflective means include four mirrors; at least two of said mirrors being dichroic mirrors; said dichroic mirrors constituting said optical filter means.

7. A device as claimed in claim 1, wherein said intermediary display means include three said display cells, respectively associated to said three chrominance images and arranged to the same distance from said projection means; said three chrominance images being simultaneously recorded.

8. A device as claimed in claim 7, wherein said reflective means include three dichroic mirrors; said three dichroic mirrors constituting said optical filter means.

9. A device as claimed in claim 7, wherein said optical recording means include:

emission means for emitting a parallel luminous beam;

deflector means for varying the direction of said parallel luminous beam;

focusing means for providing from said parallel luminous beam a focussed beam; and separator means for generating three said recording luminous spots from said focussed beam; each said recording luminous spot respectively scanning one said layer.

10. A method for projecting color images transmitted under the form of a video-signal, consisting in:

extracting three chrominance signals from said video-signal;

forming three chrominance images under the form of a durable spatial modulation of the light-scattering effect of at least one layer of a material having a smectic state; said chrominance image being obtained by applying at least one of said chrominance signals to the whole of said layer; each point of said layer being, in synchronism with said chrominance signal, successively submitted to a temporary heating, from a first temperature at which said layer is in said smectic state, to a second temperature at which said layer is in an isotropic liquid state; said durable spatial modulation occuring under the control of said chrominance signal during the consecutive cooling of said point from said second to said first temperature;

projecting white light for illuminating said three chrominance images and producing three chrominance beams emanating therefrom;

filtering said three chrominance beams for selecting in each of them a spectral band respectively corresponding to said chrominance images;

superimposing said three chrominance beams for forming a single beam;

projecting said single beam for illuminating a receiving surface with said color images.

11. A method as claimed in claim 10, further comprising the following steps:

a recording step during which said three chrominance images are recorded;

a projecting step during which said three chrominance images are simultaneously illuminated by said white light and projected onto said receiving surface;

an erasing step during which said three chrominance images are erased by applying an erasing voltage to said layer.

12. A method as claimed in claim 11, wherein said video-signal including synchronization pulses, said synchronization pulses control said three steps.

* * * * *